May 9, 1933.  E. A. ROBINSON  1,907,671
REGULATOR VALVE APPARATUS FOR LOCOMOTIVES
Filed Aug. 11, 1932
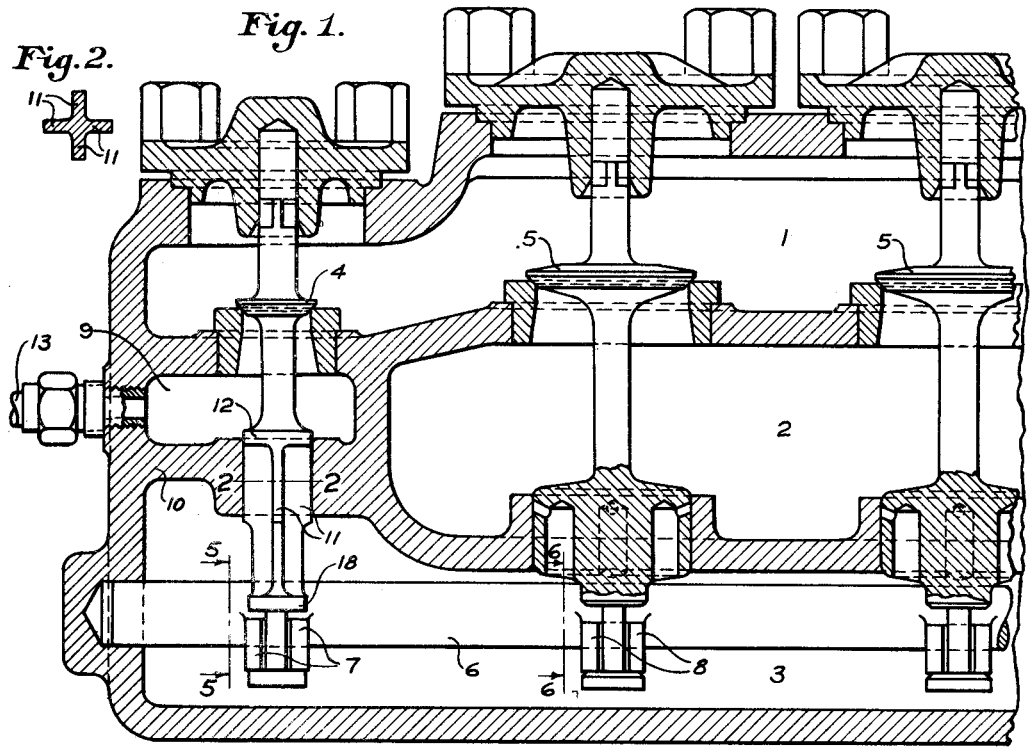
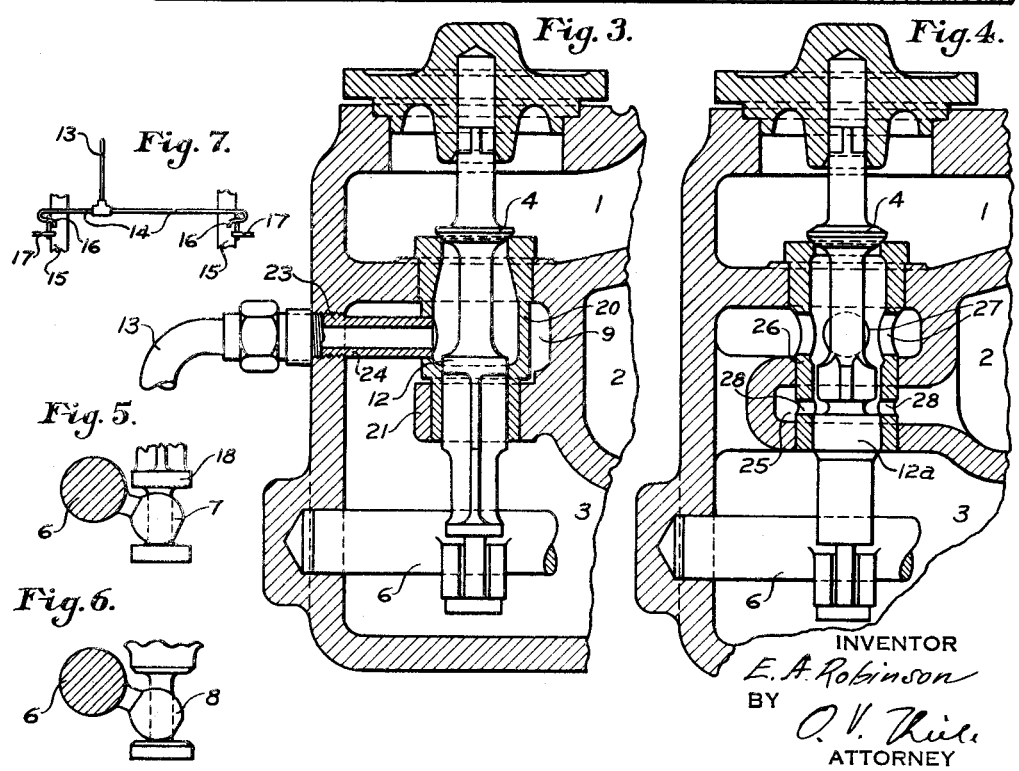
INVENTOR
E. A. Robinson
BY
O. V. Thiel
ATTORNEY Patented May 9, 1933

1,907,671

UNITED STATES PATENT OFFICE

ERIC ARTHUR ROBINSON, OF MARYLEBONE, ENGLAND, ASSIGNOR TO AMERICAN THROTTLE COMPANY, INC., OF NEW YORK, N. Y.

REGULATOR VALVE APPARATUS FOR LOCOMOTIVES

Application filed August 11, 1932, Serial No. 628,348, and in Great Britain March 15, 1932.

This invention relates to improvements in regulator valve apparatus for locomotives of the kind in which the passage of steam to the locomotive cylinders is controlled by a valve or valves provided with means for placing the valve or valves substantially in balance as to steam pressures prior to the opening of such valve or valves, there being associated with the valve or valves a pilot valve adapted when opened to admit steam to a balancing chamber of a valve housing.

When a locomotive is drifting, vacuum may be set up in the cylinders and valve chests by the reciprocations of the engine pistons, and, as the existence of such vacuum has known disadvantages, steps should be taken by the driver to prevent its creation, or to break the vacuum should it have been created. It is a common practice to open to a very slight extent the regulator valve of the locomotive so as to admit a small quantity of steam to the valve chests. Some locomotives, however, are provided with separate valves for admitting steam or air to the valve chests or cylinders when the locomotives are drifting.

The admission of steam to the valve chests when the locomotive is drifting also is of advantage in that it keeps the valve chests and cylinders warm; further should the locomotive be fitted with a steam superheater the steam so supplied may pass through the superheater and prevent overheating of the superheater elements.

Where the regulating valve is a lift valve or where a plurality of lift valves constitute the regulator valve apparatus, even a small opening of the valve or of one of the valves may supply an unnecessarily large quantity of steam to the valve chest.

It is an object of the present invention to provide means associated with the regulator valve, or regulator valve apparatus, of a locomotive whereby a small and finely regulated quantity of steam can be admitted to the valve chests and cylinders of the engine without opening the main regulator valve, or any one of the main regulator valves.

The invention principally consists in means for admitting steam to the dry-pipes and so to the valve chests and cylinders of a locomotive when the latter is drifting, wherein there is associated with the regulator lever, or equivalent, means adapted to be operated by movement of the said lever, or equivalent, whereby without opening a main regulator valve an appropriate quantity of steam can be admitted to the dry-pipes and the engine valve chests and cylinders.

Further according to the invention means for admitting steam to the valve chests and cylinders of a locomotive may be employed in regulator valve apparatus having a pilot valve controlling the supply of steam to a balancing chamber of the valve housing, and construction and arrangement being such that on opening the pilot valve and without opening a main regulator valve a small quantity of steam can be supplied directly to the engine valve chests and cylinders, such quantity being capable of regulation by varying the opening of the pilot valve.

The apparatus according to the present invention may be embodied in regulator valve apparatus of the type in which a plurality of relatively small lift valves is employed, each valve being provided with a balancing piston and the said valves and the pilot valve being operated by a rock shaft provided with cams or fingers for lifting the valves.

By means of apparatus according to the present invention the driver is enabled to effect a supply of steam to the engine cylinders when drifting sufficient to prevent the formation of, or to destroy or partially destroy, vacuum in such cylinders without opening the main regulator valve or any one of the main regulator valves.

The invention is further defined in the appended claims and constructional details of embodiments of the invention are described hereinafter with reference to the accompanying drawing, in which:

Fig. 1 is a vertical sectional view of a regulator valve apparatus embodying the invention.

Fig. 2 is a cross section through the valve spindle, the section being taken on the line 2—2 of Fig. 1.

Fig. 3 is a view of a portion of a locomotive regulator valve apparatus similar to that shown in Fig. 1 but illustrating another embodiment of the invention hereinafter described.

Fig. 4 is a view similar to Fig. 3 but illustrating a further embodiment of the invention which will be described.

Figs. 5 and 6 are sectional views on lines 5—5 and 6—6 respectively of Fig. 1, looking in the direction indicated by the arrows.

Fig. 7 is a fragmentary view on a reduced scale showing portions of the steam pipes and pipe connections to them used in connection with the present invention.

Referring to the drawing, the regulator valve housing comprises a steam supply chamber 1, a delivery chamber 2 and a balancing chamber 3, separated by appropriate walls in the valve housing. 4 is the pilot valve of the regulator valve apparatus, and 5—5 (Fig. 1) are two of the main regulator valves. It will be understood that while only two of these valves are shown, there are in practice usually more than two. 6 is the valve operating shaft. 7, 8 are cams or fingers on the shaft 6 adapted to operate the pilot valve 4 and the regulator valves 5—5 respectively. The manner in which these cams actuate the valves is understood by those familiar with this art and need not be explained here in detail. Suffice it to say that a rocking or partial rotation of the shaft 6 in the desired direction and by the desired amount is effected by suitable mechanism operated by means of a lever located in the cab and causes the cams to engage the surfaces above or below them to move the valves. A number of prior United States patents illustrate this. See for example the patent to Charles Ringel, 1,689,299 of October 30, 1928, or the patent to J. C. Marble, 1,863,020 of June 14, 1932.

Referring now more particularly to Fig. 1, 9 is a chamber which may be termed the drifting steam chamber which is divided off by a partition 10 from the balancing chamber 3 of the valve housing and through a bore in the wall or partition 10 the stem of the pilot valve 4 extends, such stem being provided with wings 11 as will be clearly seen from the cross section of the stem shown in Fig. 2. 12 is a piston or head provided on the stem of the pilot valve 4 and adapted slidably to fit in the bore in the partition 10. 13 is a pipe connected by an appropriate union with the interior of the drifting steam chamber, said pipe 13 being provided with suitable branches 14 (see Fig. 7) which are led into the main steam pipes 15, and have their ends turned as shown at 16 so as to deliver steam in the pipes 15 in the direction towards valve chests of the engine. 17, 17 indicates pipes leading from the force feed lubricator of the engine and adapted to discharge oil into the cylinder steam pipes 15. Preferably the discharge portion 16 of the branch pipes 14 conveying steam for drifting purposes is arranged so that the steam discharged by such portion 16 gathers oil delivered through the pipes 17 and carries such oil forward into the valve chests and engine cylinders. The arrangement may be such that the drifting steam will tend to atomize or emulsify the oil supplied by the mechanical or force feed lubricator from the pipes 17.

The operation of the apparatus shown in Figs. 1 and 2 briefly is as follows: On the driver operating his regulator lever or the equivalent means provided in the cab for operating and controlling the regulator valve apparatus, the first portion of the movement given to the shaft 6 will bring the cams 7 into contact with the upper head 18 of the two heads 18 and 19 on the pilot valve between which the cams 7 are disposed. After the cams engage the head 18 further movement given to the shaft 6 by continued movement of the regulator lever or equivalent will raise the pilot valve 4 from its seat as will be understood and steam will flow past the pilot valve into the drifting steam chamber 9. Should the driver be desirous of opening a main regulator valve, for example the valve 5, he will give sufficient lift to the pilot valve 4 to carry the piston head 12 on the pilot valve stem out of the bore in the partition 10 so that steam flowing past the pilot valve 4 will flow through the drifting steam chamber 9, past the wings 11 on the pilot valve stem into the balancing chamber 3. The subsequent operation of the parts is as usual and is not affected by the presence of my invention. Should the engine be drifting with steam shut off, and the driver desire to supply steam to the engine cylinders to prevent the formation of vacuum therein, he will operate the regulator lever or equivalent to raise the pilot valve to a small extent from its seat, the amount of lift being insufficient to carry the piston head 12 out of the bore in the partition 10. Steam flowing past the pilot valve 4 into the drifting steam chamber 9 consequently will flow through the pipes 13 and 14 into the main steam pipes 15 leading to the engine valve chests. The quantity of steam supplied when the engine is drifting may be varied by varying the opening of the pilot valve 4. It will be appreciated that the pipe 13 is constantly open to the drifting steam chamber 9 and thus when the pilot valve is open for the purpose of supplying steam to the balancing chamber 3 to assist the opening of the main throttle valves steam will be supplied to the engine through pipe 13 in addition to the steam supplied by the opening of one or more of the main throttle valves which steam passes to the engine through the delivery chamber 2 and the main steam pipes 15 which are connected thereto.

Referring now to Fig. 3 the embodiment of the invention therein illustrated is suitable for converting an existing valve apparatus into one comprising drifting valve means according to the present invention. The partition wall between the steam supply chamber 1 and the balancing chamber 3 of the valve housing has an opening in which in the original form of the apparatus there is a bushing at the upper end of which there is the valve seat. Beneath this opening is a bracket or lug 21 with an opening in it which heretofore served as a guide for the stem of the pilot valve. These two openings or bores are in my construction used to accommodate a chamber used in connection with the invention, the improvement including drifting valve means. A tubular member or sleeve 20 is mounted in the partition wall where the valve bushing was formerly located and extends into the bore of the bracket 21. The pipe 13 is connected to chamber 20 by a suitable union member screwed into the wall of the valve housing at 23 and having an extension 24 fitted into an aperture in the member 20. The tubular member 20 provides at its upper end a seat for the pilot valve 4 and in its lower portion the bore adapted to receive the piston head 12 on the pilot valve stem.

The embodiment of the invention illustrated in Fig. 3 operates in the same manner as that shown in Fig. 1 and thus description of its operation is unnecessary.

An alternative embodiment of the invention is illustrated in Fig. 4. In the construction illustrated a pocket 25 is provided in the balancing chamber 3 of the valve housing, this pocket forming an extension of and being constantly open to the delivery chamber 2. A tubular member 26 is provided through which the stem of the pilot valve 4 extends, 12$^a$ being a piston or head on the pilot valve stem slidably fitting the lower portion of the tubular member 26. Ports 27 provide communication between the interior of the tubular member 26 and the balancing chamber 3 and ports 28 provide communication between the bore of the tubular member 26 and the pocket 25. In the closed position of the regulator lever or the equivalent in the driver's cab the parts occupy the position shown in the drawing, the pilot valve 4 being closed. On the regulator lever being operated to supply a small quantity of steam for drifting purposes the valve operating shaft 6 will be operated to raise the pilot valve 4 from its seat to a small extent and steam will flow past the pilot valve into the balancing chamber 3 and the pocket 25 and from the pocket 25 into the delivery chamber 2, whence it will pass to the engine valve chests by way of the usual main steam pipes. The quantity of steam supplied for drifting is varied by moving the pilot valve between its closed position and the position in which piston 12$a$ completely closes ports 28. On starting from the closed position the regulation occurs first at the valve. The restriction of the ports 28 by piston 12$a$ is at this initial stage of no effect as sufficient passage through the ports is present to pass all the steam passed by the valve 4. The amount of opening of the valve therefore effects the regulation at this time. As the valve is raised further, a point will be reached where the amount of steam passed by the valve is in excess of what the orifices 28 will allow to pass with the amount of restriction of these orifices at such time. From then on the regulation of the amount of drifting steam is effected by the piston head 12$a$. When the shaft 6 has opened the first of the main regulator valves the pilot valve will have been raised to an extent such that the piston head 12$^a$ will close the ports 28 and the regulator valve apparatus will function in the same manner as described in the earlier specifications above referred to.

It will be understood that when the driver desires to supply a small quantity of steam to the engine when the latter is drifting he will open the pilot valve to an appropriate extent, but he should not move the lever sufficiently to open any of the main regulator valves.

It is to be understood that the invention is not restricted to the constructional details above described and shown in the drawing as such details might be varied without departing from the invention.

What I claim is:

1. In a locomotive multiple regulator of the class described having a plurality of valves controlling the steam flow from the boiler to the engines, each valve having a balancing piston subject to pressure in a common balancing chamber, an intermediate chamber, a passage for supplying steam to it, a passage connecting it with the balancing chamber, a duct connecting it with the two steam chests, and a duplicate pilot valve comprising a disk-valve portion controlling the inlet to said intermediate chamber and a piston-head portion reciprocable into and out of said second-named passage and thereby controlling the outlet from it to the balancing chamber, the first opening movement of the duplicate valve raising the disk valve and opening the port from the steam supply to the intermediate chamber, and further movement withdrawing the piston head from the said second passage and opening communication from the intermediate chamber to the balancing chamber.

2. In locomotive multiple regulator valve apparatus of the kind wherein a plurality of relatively small lift valves is employed to control the supply of steam to the engine, the valves being disposed in a chambered housing and each of them being provided with a balancing piston, the balancing steam being controlled by a pilot valve, said valves and pilot valve being operated by a rockshaft provided with cams or fingers to lift them, the combination of means partitioning off a space in the housing to form a drifting steam chamber, the upper wall of said drifting steam chamber being ported and the lower wall having a cylindrical bore alined with said port, piping connecting the drifting steam chamber to the two valve chests, the pilot valve seating on said port, a piston connected to said pilot valve and reciprocable in the upper part of the cylindrical bore and guide wings secured to the lower side of said piston and engaging the cylindrical bore, said piston working in said bore and constituting a valve preventing steam admission from the drifting valve chamber to the balancing chamber until a predetermined lift of the pilot valve has been exceeded.

3. Locomotive regulator valve apparatus as claimed in claim 2, wherein the drifting steam chamber is formed by a tubular member removably mounted in the valve housing and comprising a seat for the pilot valve and the bore in which works the piston connected to the valve.

In testimony whereof I hereunto affix my signature.

ERIC ARTHUR ROBINSON.